United States Patent Office 3,507,871
Patented Apr. 21, 1970

3,507,871
IMIDES OF 2:6-DIARYL-AMINO-NAPHTHALENE-1:4:5:8-TETRACARBOXYLIC ACID
Francis Irving and Donald Graham Wilkinson, Manchester, England, assignors to Imperial Chemical Industries Limited, London, England, a corporation of Great Britain
No Drawing. Filed Feb. 6, 1967, Ser. No. 614,052
Claims priority, application Great Britain, July 1, 1966, 29,610/66
Int. Cl. C07d *29/26;* C07b *53/00*
U.S. Cl. 260—281                            6 Claims

ABSTRACT OF THE DISCLOSURE

Imides of 2:6 - dianilinonapthalene - 1:4:5:8-tetracarboxylic acid containing from two to four hydroxyalkyl groups, and the use of the imides as dyestuffs for the mass-coloration of synthetic linear polyesters.

---

This invention relates to polycyclic dyestuffs and more particularly it relates to polycyclic dyestuffs which are valuable for the mass coloration of synthetic linear polyesters.

According to the invention there are provided the polycyclic dyestuffs of the formula

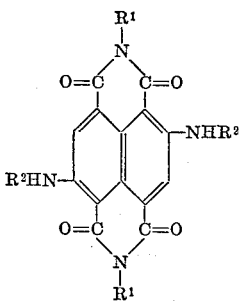

wherein $R^1$ represents a lower alkyl, hydroxy lower alkyl, hydroxy lower alkoxy lower alkyl or optionally substituted aryl radical, and $R^2$ represents an optionally substituted aryl radical, provided that the dyestuffs contain at least two hydroxy lower alkyl or hydroxy lower alkoxy lower alkyl radicals which can either be represented by $R^1$ or which are attached either directly or through bridging atoms or groups to aryl radicals represented by $R^1$ or $R^2$.

Throughout this specification the terms "lower alkyl" and "lower alkoxy" are used to denote alkyl and alkoxy radicals respectively containing from 1 to 4 carbon atoms.

As examples of the lower alkyl radicals represented by $R^1$ there may be mentioned methyl, ethyl, n-propyl and n-butyl radicals. As examples of the hydroxy lower alkyl radicals represented by $R^1$ or which may be present as substituents on the aryl radicals represented by $R^1$ or $R^2$ there may be mentioned β-hydroxyethyl, β- or γ-hydroxypropyl, β:γ-dihydroxypropyl and δ-hydroxy-n-butyl radicals. As examples of the hydroxy lower alkoxy lower alkyl radicals represented by $R^1$ or which may be present as substituents on the aryl radicals represented by $R^1$ or $R^2$ there may be mentioned β-(β'-hydroxyethoxy)ethyl, β- or γ-(β'-hydroxyethoxy)-n-propyl and ω-(β'-hydroxyethoxy)-n-butyl radicals.

When the dyestuffs contain hydroxy lower alkyl or hydroxy lower alkoxy lower alkyl radicals attached to aryl radicals represented by $R^1$ and $R^2$ the said substituted alkyl radicals can either be attached directly to the said aryl radicals, or attached through bridging atoms or groups such as —O—, —S—,

or

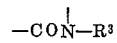

wherein $R^3$ is a hydrogen atom or a lower alkyl or hydroxy lower alkyl radical.

The aryl radicals represented by $R^1$ and $R^2$ are preferably monocyclic aryl radicals such as phenyl and tolyl radicals, and these can contain substituents other than sulphonic acid groups. As examples of the said substituents there may be mentioned lower alkoxy, chlorine, bromine, hydroxy lower alkyl, hydroxy lower alkoxy, hydroxy lower alkoxy lower alkoxy and hydroxy lower alkylthio.

According to a further feature of the invention there is provided a process for the manufacture of the polycyclic dyestuffs of the invention which comprises reacting 2:6-dichloronapthalene-1:4:5:8-tetracarboxylic acid or the corresponding anhydride with an amine of the formula $R^1$—$NH_2$ and reacting the resulting imide of the formula:

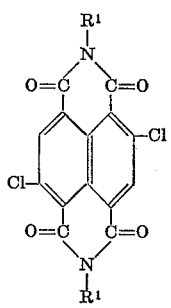

with an amine of the formula $R^2$—$NH_2$ wherein $R^1$ and $R^2$ have the meanings stated, the said amines being so chosen that the resulting dyestuff contains at least two hydroxy lower alkyl or hydroxy lower alkoxy lower alkyl radicals.

The process of the invention can be conveniently brought about by stirring the said acid or anhydride and the amine of the formula $R^1NH_2$ together in a solvent, such as acetic acid, preferably at a temperature between 80° C. and the boiling point of the solvent, until the imide is obtained. This is preferably isolated and then reacted with the amine of the formula $R^2NH_2$ by heating the reactants together in a solvent, such as nitrobenzene or an excess of the said amine, and in the presence of an acid-binding agent, preferably at a temperature between 150° C. and the boiling point of the solvent. The resulting dyestuff can then be isolated by conventional methods. Alternatively when the amines $R^1NH_2$ and $R^2NH_2$ are the same the reaction can be carried out in one stage.

As examples of amines of the formula $R^1NH_2$ which can be used in the said process there may be mentioned methylamine, ethylamine, propylamine, β-hydroxyethylamine, β- or γ-hydroxypropylamine, β:γ-dihydroxypropylamine, β-(β'-hydroxyethoxy)ethylamine, β- or γ-(β'-hydroxyethoxy)propylamine, aniline, 2-, 3- or 4-toluidine, 2-, 3-, or 4-chloroaniline, 2-, 3-, or 4-bromoaniline, 2-, 3- or 4-anisidine, 2-, 3- or 4-(β-hydroxyethoxy)aniline and 2-, 3- or 4-[β(β'-hydroxyethoxy)ethoxy]aniline.

As examples of amines of the formula $R^2NH_2$ which can be used in the process of the invention there may be mentioned aniline, 2-, 3- or 4-toluidine, 2-, 3- or 4-chloroaniline, 2-, 3- or 4-bromoaniline, 2-, 3- or 4-anisidine, 2-, 3- or 4-(β-hydroxyethoxy)aniline and 2-, 3- or 4-[β-(β'-hydroxyethoxy)ethoxy]aniline.

A preferred class of the polycyclic dyestuffs of the invention comprises the polycyclic dyestuffs of the formula:

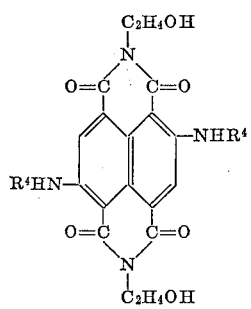

wherein $R_4$ represents a phenyl radical which may contain substituents other than sulphonic acid groups.

The polycyclic dyestuffs of the invention when incorporated into synthetic linear polyesters, in particular polyethyleneterephthalate, by mass-coloration techniques yield blue shades possessing excellent fastness to washing, pressure steaming, acid-cross dyeing, perspiration, rubbing after teaming, dry heat treatments such as are used in pleating operations, and to light. It is also found that heavy depths of shade can be obtained without the presence of the amounts of the dyestuff necessary to obtain such depths of shade having a detrimental effect on the effect on the physical properties of the synthetic linear polyesters. The dyestuffs also have excellent stability to the conditions employed in carrying out the mass-coloration.

The invention is illustrated but not limited by the following examples in which the parts and percentages are by weight.

Example 1

A mixture of 100 parts of 2:6-dichloronaphthalene-1:4:5:8-tetracarboxylic acid anhydride, 73 parts of β-hydroxyethylamine and 1500 parts of acetic acid is stirred for 3 hours at the boil under a reflux condenser. The mixture is then cooled to 20° C. and the precipitated bis(β-hydroxyethylamide) of 2:6-dichloronaphthalene-1:4:5:8-tetracarboxylic acid is filtered off, washed with acetic acid, then with water and is finally dried.

A mixture of 42.3 parts of this product, 140 parts of aniline, 21 parts of sodium acetate and 11 parts of sodium carbonate is stirred for 10 hours at 190° to 195° C. The mixture is then cooled to 70° C., poured into 200 parts of methanol, the resulting mixture cooled to 20° C., and the precipitated dyestuff is then filtered off, washed with methanol and dried. The dyestuff crystallises from chlorobenzene in the form of bright reddish-blue micro needles.

When the dyestuff is incorporated into polyethylene terephthalate by mass-coloration techniques the polymer is coloured in bright blue shades of excellent fastness properties.

Example 2

A mixture of 42.3 parts of the bis(β-hydroxyethylimide) of 2:6-dichloronaphthalene-1:4:5:8-tetracarboxylic acid, 230 parts of 4-(β-hydroxyethoxy)aniline, 21 parts of anhydrous sodium acetate and 11 parts of sodium carbonate is stirred for 10 hours at 190° to 195° C. The mixture is then poured into water, acidified with a concentrated aqueous solution of hydrochloric acid, the mixture heated to the boil, and the precipitated dyestuff is filtered off, washed with hot water and dried. The dyestuff crystallises from pyridine in the form of blue micro-needles.

When the dyestuff is incorporated into polyethylene terephthalate by mass-coloration techniques the polymer is coloured in blue shades of excellent fastness properties.

Example 3

A mixture of 210 parts of 2:6-dichloronaphthalene-1:4:5:8-tetracarboxylic acid anhydride in 4000 parts of 4-(β-hydroxyethoxy)aniline is stirred for 10 hours at 195° C. The mixture is poured into water, acidified with a concentrated aqueous solution of hydrochloric acid, the mixture heated to the boil, and the precipitated dyestuff is then filtered off, washed with hot water and dried. The dyestuff crystallises from β-ethoxyethanol in the form of blue micro-needles.

When the dyestuff is incorporated into polyethylene terephthalate by mass-coloration techniques the polymer is coloured in blue shades of excellent fastness properties.

Example 4

A mixture of 53 parts of the bis(β-hydroxyethylimide) of 2:6-dichloronaphthalene-1:4:5:8-tetracarboxylic acid, 255 parts of p-chloroaniline, 26 parts of sodium acetate and 14 parts of sodium carbonate is stirred for 10 hours at 190° to 195° C. under super-atmospheric pressure. The resulting mixture is diluted with methanol, and the precipitated dyestuff is filtered off, washed with methanol then with water, and is finally dried. The dyestuff crystallizes from o-dichlorobenzene in the form of blue micro-needles.

When the dyestuff is incorporated into polyethylene terephthalate by mass-coloration techniques the polymer is coloured in blue shades of excellent fastness properties.

Similar dyestuffs, giving blue to greenish-blue shades, are obtained when the p-chloroaniline used in this example is replaced by equivalent amounts of o- or m-chloroaniline, p-bromoaniline, o-, m- or p-toluidine or p-anisidine.

When these dyestuffs are incorporated into polyethylene terephthalate by mass-coloration techniques the polymer is coloured in blue shades of excellent fastness properties. The shades obtained from these dyestuffs vary slightly, that obtained from p-anisidine being slightly greener than the dyestuff obtained from aniline which in turn is slightly greener than that obtained from p-chloroaniline.

Example 5

In the place of the 42.3 parts of the imide used in Example 2 there are used 39.1 parts of the bis(ethylimide) of 2:6-dichloronaphthalene-1:4:5:8-tetracarboxylic acid whereby a similar dyestuff is obtained.

The bis(ethylimide) used in this Example was obtained by reacting 2:6-dichloronaphthalene-1:4:5:8-tetracarboxylic acid anhydride with ethylamine in the presence of acetic acid.

Example 6

A mixture of 112 parts of 2:6-dichloronaphthalene-1:4:5:8-tetracarboxylic acid anhydride, 125 parts of p-(β-hydroxyethylthio)aniline and 1000 parts of acetic acid is stirred for 1 hour at the boil under a reflux condenser. The mixture is cooled to 20° C., and the precipitated bis[p-(β-hydroxyethylthio)phenylimide] of 2:6-dichloronaphthalene-1:4:5:8-tetracarboxylic acid is filtered off, washed with acetic acid, and then with water, and is dried.

A mixture of 121 parts of this product, 250 parts of aniline, 42 parts of sodium acetate and 22 parts of sodium carbonate is stirred for 10 hours at 180° to 190° C. The mixture is cooled to 60° C., 400 parts of methanol are added, the mixture is then cooled to 20° C., and the precipitated dyestuff is filtered off, washed with methanol, then with water, and is finally dried. The dyestuff crystallises from chlorobenzene in the form of bright blue micro needles.

When the dyestuff is incorporated into polyethylene terephthalate by mass coloration techniques the polymer is coloured in blue shades of excellent fastness properties.

In place of the 125 parts of p-(β-hydroxyethylthio)-aniline used in this example there are used 101 parts of p-(β-hydroxyethyl)aniline when a similar dyestuff is obtained.

EXAMPLE 7

The bis(γ - hydroxy-n-propylimide), bis(β - hydroxy-n-propylimide), bis(hydroxy - isopropylimide), bis(γ - hydroxy-n-butylimide) or bis(β-hydroxyethoxyethylimide) of 2:6-dichloronaphthalene-1:4:5:8 - tetracarboxylic acid are condensed with aniline by the method described in the second paragraph of Example 1 to give similar blue dyestuffs.

The imides used in this example were obtained by condensing γ - hydroxy - n - propylamine, β-hydroxy-n-propylamine, hydroxyisopropylamine, γ - hydroxy - n-butylamine or β-(β'-hydroxyethoxy)ethylamine respectively with 2:6 - dichloronaphthalene - 1:4:5:8 - tetracarboxylic acid anhydride by methods similar to that described in the first paragraph of Example 1.

EXAMPLE 8

A mixture of 85 parts of 2:6-dichloronaphthalene-1:4:5:8-tetracarboxylic acid anhydride, 120 parts of 4-amino-N-(β-hydroxyethyl)aniline, 120 parts of sodium acetate and 1000 parts of acetic acid is stirred for 30 minutes at the boil under a reflux condenser. The mixture is then cooled and the precipitated bis[4'-(β-hydroxyethylamino)phenylimide] of 2:6 - dichloronaphthalene-1:4:5:8-tetracarboxylic acid is filtered off, washed with acetic acid, then with water, and is finally dried.

A mixture of 120 parts of this product, 85 parts of sodium acetate, 45 parts of sodium carbonate and 570 parts of aniline is stirred for 10 hours at 190° to 195° C. The mixture is cooled, poured into 2500 parts of water, the resulting mixture is acidified with an aqueous solution of hydrochloric acid, and the precipitated dyestuff is filtered off, washed with water and dried.

It crystallises from pyridine in the form of reddish-blue microneedles.

When the dyestuff is incorporated into polyethylene terephthalate by mass-coloration methods the polymer is coloured in bright blue shades of excellent fastness properties.

In place of the 120 parts of 4-amino-N-(β-hydroxyethyl)aniline used in this example there are used 74 parts of 4-(β-hydroxyethyl)aniline, or 97 parts of 4-aminobenz-N-(β-hydroxyethyl)amide or 104 parts of 4-aminobenz - N - methyl-N-(β-hydroxyethyl)amide or 120 parts of 4 - aminobenz - N:N - di(β - hydroxyethyl)amide when similar dyestuffs are obtained.

We claim:
1. The polycyclic dyestuffs of the formula:

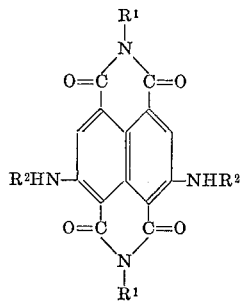

wherein $R^1$ is selected from the class consisting of lower alkyl, hydroxy lower alkyl, hydroxy lower alkoxy lower alkyl and $R^2$; $R^2$ is selected from the class consisting of phenyl, tolyl, chlorophenyl, bromophenyl, lower alkoxyphenyl, hydroxy lower alkylaminophenyl, hydroxy lower alkylphenyl, hydroxy lower alkyl thiophenyl, hydroxy lower alkoxyphenyl, carbo - N - (hydroxy lower alkyl) amidophenyl, carbo-N:N-di(hydroxy lower alkyl)amidophenyl and carbo-N-lower alkyl-N-(hydroxy lower alkyl) amidophenyl; provided that from 2 to 4 of the groups represented by $R^1$ and $R^2$ include hydroxy lower alkyl.

2. The polycyclic dyestuff as claimed in claim 1 wherein $R^1$ is β-hydroxyethyl and $R^2$ is phenyl.

3. The polycyclic dyestuff as claimed in claim 1 wherein $R^1$ is β-hydroxyethyl and $R^2$ is chlorophenyl.

4. The polycyclic dyestuff as claimed in claim 1 wherein $R^1$ is β-hydroxyethyl and $R^2$ is tolyl.

5. The polycyclic dyestuff as claimed in claim 1 wherein $R^1$ is β-hydroxyethyl and $R^2$ is bromophenyl.

6. The polycyclic dyestuff as claimed in claim 1 wherein $R^1$ is β-hydroxyethyl and $R^2$ is methoxyphenyl.

References Cited

UNITED STATES PATENTS

| | | | |
|---|---|---|---|
| 1,758,313 | 5/1930 | Elkert | 260—155 |
| 2,087,133 | 7/1937 | Vollmann | 260—281 |
| 2,914,531 | 11/1959 | Staeuble et al. | 260—281 X |

FOREIGN PATENTS

| | | |
|---|---|---|
| 1,195,762 | 7/1965 | Germany. |

DONALD G. DAUS, Primary Examiner

U.S. Cl. X.R.

8—55; 260—155, 583, 578